THERMOELECTRIC AIR CONDITIONING UNIT

Filed April 15, 1960 2 Sheets-Sheet 1

INVENTOR
CARL F. ALSING
BY [signature]
ATTORNEY

THERMOELECTRIC AIR CONDITIONING UNIT

Filed April 15, 1960 2 Sheets-Sheet 2

INVENTOR
CARL F. ALSING
BY William [signature]
ATTORNEY

United States Patent Office 3,040,538

Patented June 26, 1962

3,040,538

THERMOELECTRIC AIR CONDITIONING UNIT

Carl F. Alsing, Wilbraham, Mass., assignor to Westinghouse Electric Corporation, East Pittsburgh, Pa., a corporation of Pennsylvania Filed Apr. 15, 1960, Ser. No. 22,442
2 Claims. (Cl. 62—3)

This invention relates to air conditioning apparatus and more particularly to room or unit type air conditioning units employing thermoelectric heat pumping means.

Thermoelectric heat pumping devices employing the Peltier principle of heat absorption and heat dissipation at junctions of current carrying, dissimilar thermoelectric bodies are particularly suitable for room air conditioner applications because of their quietness of operation resulting from the absence of moving parts. The principal disadvantage of present day thermoelectric devices lies in the large number of thermoelectric bodies and junctions required to produce a useful heat pumping effect with presently known materials.

It is the principal object of this invention to provide a compact and efficient arrangement of thermoelectric arrays, i.e. series of thermoelectric bodies and junction members which can be housed in a relatively small casing which, in turn, can be disposed in a window or other wall opening of the room or space to be conditioned.

In accordance with the invention the thermoelectric heat pumping system is broken up, or divided, into a plurality of arrays, each of which is formed as a panel, or partition, and the several panels are disposed in spaced relationship to one another within the air conditioner casing in such a manner as to provide air passages therebetween. The thermoelectric arrays for each of the panels are so constructed as to pump heat from one face of the panel to the opposite face of the panel and these arrays are further constructed and electrically connected in such a manner that the direction in which heat is pumped is alternated from panel to panel. In this arrangement, opposing faces of adjacent panels are either both heated or both cooled so that they mutually act to cool or heat air conveyed through the passage therebetween. This also results in the several passages being alternately heated or cooled.

Suitable air propelling means are incorporated into the air conditioning unit for circulating room air, i.e., air to be conditioned, through certain of the passages while outside air is circulated through the other passages. Suitable baffles and bulkheads are provided to prevent intermingling of the two air streams. The series of panel-like heat pumping units employed in practising this invention is particularly amenable to the disposal of moisture condensed from the air being conditioned by conveying this moisture into the outside air stream and to the utilization of this moisture to assist in removing heat from the heat dissipating faces, or portions, or the thermoelectric panels. With the thermoelectric panels disposed in vertically spaced horizontal positions the provision of simple drain means through those panels which have their heat absorbing face disposed upwardly enables moisture condensed in the passage thereabove to flow through the panel into the passage immediately therebelow and in which heat is dissipated to the outside air. Water falling onto the warm surface portions of the heat dissipating surface of the panel therebelow is vaporized and carried away in the outside air stream.

Other objects, advantages and features of the invention will be apparent from the following detailed description wherein reference is made to the accompanying drawings forming a part hereof, and wherein.

Figure 1:
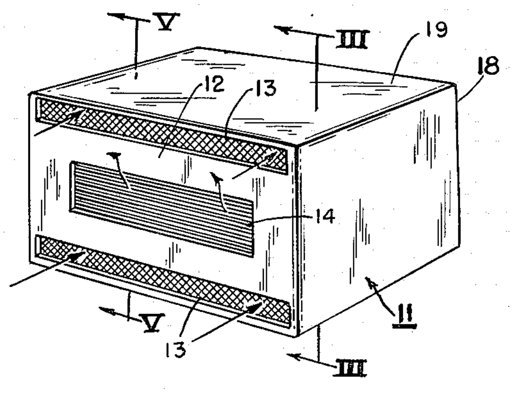
FIG. 1 is a three-quarter front perspective view of an air conditioning unit embodying this invention.
Figure 2:
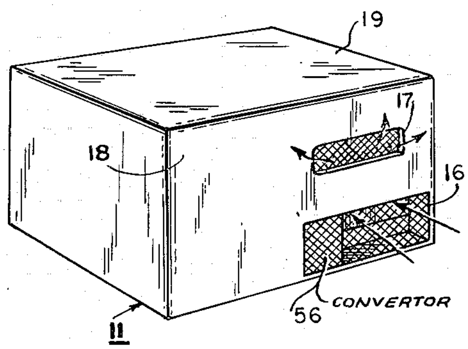
FIG. 2 is a three-quarter rear perspective view of the unit.

The room, or unit type, air conditioning unit illustrated in FIGS. 1 and 2 is of the type normally employed to cool and condition the air in a moderate sized room and is of such size as to enable the unit to be installed in a window or other wall opening of the room. The unit includes a heat insulated casing or outer shell 11 having a front wall 12 provided with room air inlet openings 13 and a room air outlet opening 14. Outdoor air is admitted to and discharged from the unit, respectively, through an inlet opening 16 and an outlet opening 17 in the rear wall 18 of the unit. The unit casing has substantially flat, horizontal top and bottom walls indicated at 19 and 20, respectively.

Figure 3:
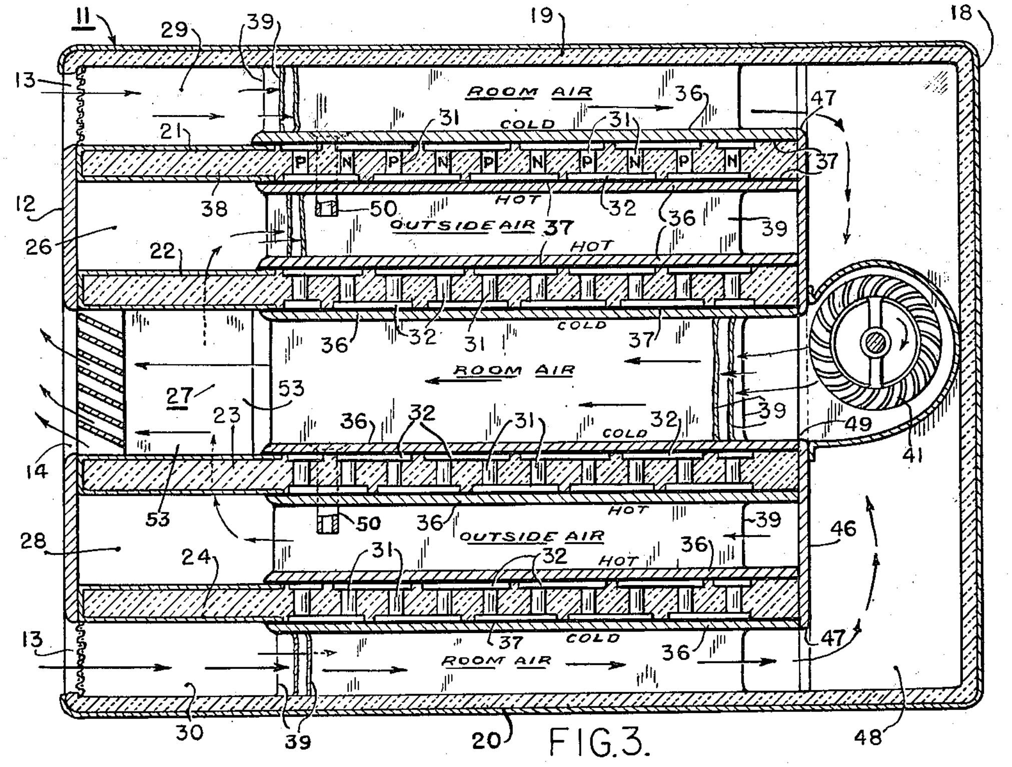
FIG. 3 is an enlarged vertical sectional view through the unit, taken as indicated generally by the line III—III in FIG. 1.

Referring to FIG. 3, the unit casing 11 encloses a plurality of plate-like panels 21, 22, 23 and 24, which are arranged horizontally and spaced vertically to provide air passages 26, 27 and 28 therebetween. Two additional air passages, 29 and 30, are provided, respectively, between the uppermost panel 21 and the casing top wall 19 and between the lowermost panel 24 and the casing bottom wall 20.

As indicated by legends in FIG. 3, passages 27, 29 and 30 are adapted to handle room air, i.e., air from the enclosure to be conditioned. Passages 26 and 28 are adapted to carry outside air. In accordance with this invention, heat is removed from room air and dissipated into outside air by thermoelectric heat pumping means carried by and forming a part of panels 21, 22, 23 and 24.

The thermoelectric heat pumping means for each of the panels 21, 22, 23 and 24 comprises an array, or system, of thermoelectric bodies 31 and connector, or junction strips 32. The thermoelectric bodies 31 are alternately formed of one or the other of two materials having different thermoelectric properties, the differing bodies being distinguished in the drawings by the letters N and P, indicating that the material from which that body is made is either electromotively "negative" or electromotively "positive." The connector strips 32 connect adjacent ends of dissimilar bodies 31 in such a manner as to form a series electrical circuit through the bodies and the strips. Upon the passage of direct electrical current through the thermoelectric array heat is absorbed at those junction strips wherein current is passing from an N body to a P body and heat is dissipated to those junction strips wherein current is flowing from a P body to an N body. It can thus be seen that, depending upon the direction of current flow through the thermoelectric array, heat can be either absorbed at or dissipated from the upper set of junction strips 32 for each of the thermoelectric arrays and heat can be respectively dissipated from and absorbed at the lower set of junction strips 32 for each array.

That region of each of the panels 21, 22, 23 and 24 which contains a thermoelectric array is preferably covered on both its upper and lower surfaces with heat conducting face plates 36 which are in heat transfer relationship with junction strips 32 of the array. The face plates 36 are electrically insulated from the junction strips by means of a thin surface coating or layer of electrical insulation 37. The interior of each of the panels 21 through 24 is also preferably filled with thermal insulation 38 to minimize the flow of heat through the panels in the direction opposite to that in which it is pumped by the thermoelectric array of the panel.

The thermoelectric arrays for the several panels are preferably electrically connected in such a manner that the current flowing therethrough produces a cooling effect on the upper faces of panels 21 and 23 and a cooling effect on the lower faces of panels 22 and 24. A heating effect is produced on the opposite faces of the respective panels. Thus, opposed faces of adjoining panels are concurrently heated or cooled so as to additively cool or heat the air flowing through the passages therebetween. The uppermost passage 29 and the lowermost passage 30, conveying room air, are both cooled by the panel face contiguous to these passages.

The several air passages 27 through 29 may have extended surface heat transfer fins 39 disposed therein and extending parallel to the path of air flow through the passages. These fins are preferably soldered or otherwise secured in good heat transfer relationship with the face plates 36 of the panels 21 contiguous thereto to assist in transferring heat between the face plates and the air flowing through the passages.

Figures 5, 6, 7:
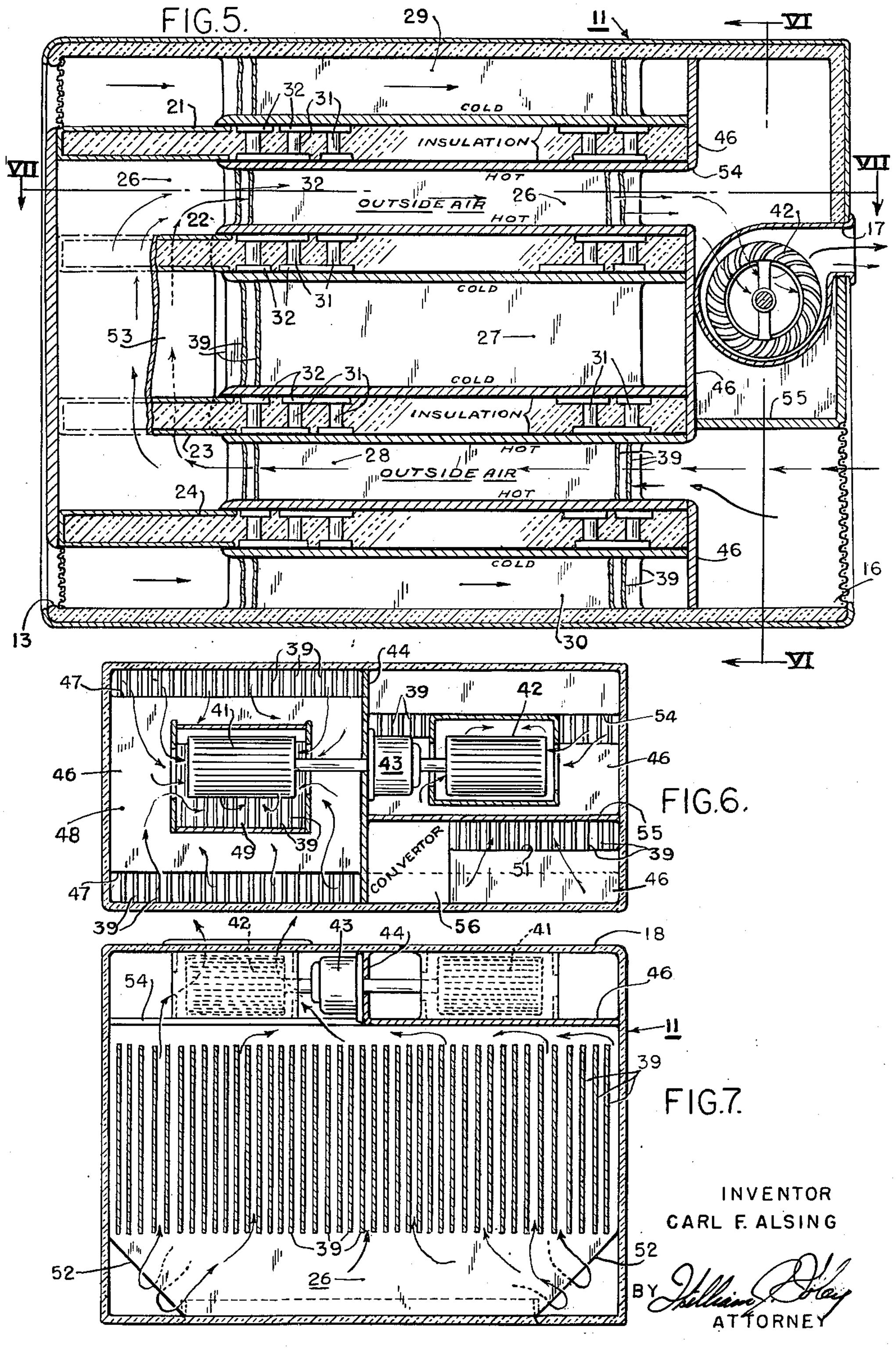
FIG. 5 is another sectional view through unit, taken generally as indicated by the line V—V in FIG. 1.
FIG. 6 is a vertical sectional view through the rear portion of the unit, which is taken as indicated by the line VI—VI in FIG. 5.
FIG. 7 is a horizontal sectional view through the unit taken as indicated by the line VII—VII in FIG. 5.

Circulation of room air and outside air through the appropriate passages within the air conditioner casing 11 is effected by air circulating means disposed in the rear portion of the unit and comprising a room air blower 41, an outside air blower 42 and a motor 43 for driving both blowers (see FIGS. 6 and 7). Motor 43 is preferably carried by a heat insulated partition 44 extending forwardly from the rearward wall 18 of the casing 11 and functioning to segregate room air and outside air. A similar segregating function is performed by a heat insulating partition or bulkhead 46, mounted vertically in the rear portion of the air conditioner casing and extending from one side wall to the other side wall of the casing. Partition 46 abuts against the rear edges of the several panels 21 through 24 and is provided with suitable openings for directing the progress of room air and outside air through the unit.

Air from the room or enclosure to be conditioned enters the casing 11 through inlet openings 13 and flows through passages 29 and 30, respectively, passes rearwardly through openings 47 in partition 46 and into a plenum chamber 48 located at the rear of the unit. In flowing through passages 29 and 30 in contact with heat transfer fins 39 the room air is partially cooled. This air is then drawn into blower 41 and discharged therefrom through another opening 49, in bulkhead 46 into passage 27 in which it is subjected to the cooling effect produced by the thermoelectric arrays in panels 22 and 23 and is further cooled and moisture is condensed therefrom. The fully conditioned air then leaves the unit through outlet opening 14.

Figure 4:
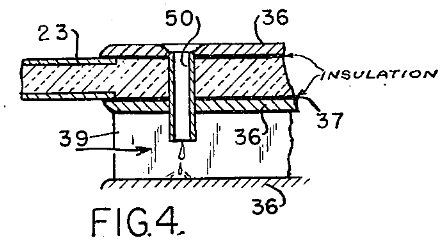
FIG. 4 is an enlarged fragmentary view illustrating the condensate draining means employed in the unit.

Moisture condensed from room air is preferably conveyed through panel 23 to outside air passage 28 by a drain means in the form of a drainpipe 50 (see FIG. 4). If desired, the surface of face plate 36 on panel 23 may be sloped to assist water collecting thereon in draining toward drainpipe 50.

Because room air is only partially cooled in passages 29 and 30 it is not essential that drain means be provided for conveying condensate from these passages, although, as shown in FIG. 3, a drainpipe 50 can be conveniently provided from the upper passage, 29, through panel 21, which will discharge condensate onto the warm surface of panel 22 therebelow.

Outside air is drawn into the unit through opening 16 in the rear wall 18 of the casing, passes through an opening 51 (FIG. 6) in bulkhead 46 and flows through outside air passage 28 between panels 23 and 24. Heat pumped by the thermoelectric arrays in these panels, 23 and 24, is dissipated to the outside air via heat transfer fins 39 in passage 28. As best shown in FIGS. 5 and 7, panels 22 and 23 have triangular shaped cutouts 52 (FIG. 7) at their forward corners to permit outside air leaving passage 28 to flow upwardly into the forward portion of outside air passage 26. The intermingling of room air and outside air in this region of the unit is prevented by upright partitions 53 extending between the cutout portions of the panels 22 and 23. Outside air continues its passage through the unit by flowing rearwardly in passage 26 into contact with fins 39 conducting heat away from panels 21 and 22. Heated air leaves passage 26 through an opening 54 in bulkhead 46 and is propelled through outlet opening 17 by outside air blower 42. A horizontal baffle 55 disposed beneath blower 42 prevents intermingling of incoming and outgoing outside air.

Since thermoelectric heat pumps require direct electrical current for their energization and since most homes have an alternating current supply system it is desirable to provide means in the air conditioning unit for converting household alternating current to direct current of the voltage required for the thermoelectric heat pump. A converter 56 for this purpose may be conveniently located at the rear portion of the air conditioner in a region where it will be subjected to a flow of outside air for cooling purposes, such as, for example, the location shown therefor in FIGS. 2 and 6 of the drawings.

The air conditioning unit embodying this invention is described above as functioning principally to cool room air to comfort condition a a room during warm weather. The unit is not limited, however, solely to cooling room air. It is a basic characteristic of thermoelectric heat pumping apparatus that the direction in which heat is pumped therethrough can be reversed simply by reversing the direction of electric current flowing therethrough. Thus, by changing the direction of the current supplied to each of the thermoelectric arrays in panels 21, 22, 23 and 24 it is possible to reverse the direction of heat flow through the several panels, so as to absorb heat from outdoor air and add heat to room air flowing through the unit. The usefulness of the unit can thereby be extended to climatic conditions under which heating of room air is desired.

From the foregoing it should be apparent that this invention provides a novel, compact arrangement for utilizing thermoelectric heat pumping apparatus in a unit type air conditioner. The disposition of several sections of the thermoelectric system in a plurality of panel members which also divide the unit into air flow passages enables the unit to be constructed with minimum overall dimensions although the thermoelectric system itself may comprise a large number of individual thermoelectric elements and junction members.

While the invention has been shown in but one form, it will be obvious to those skilled in the art that it is not so limited, but is susceptible of various changes and modifications without departing from the spirit thereof.

What is claimed is:

1. In an air conditioner, a casing, a plurality of vertically spaced horizontal panels in said casing providing horizontal air flow passages therebetween, each of said panels including thermoelectric heat pumping means arranged to pump heat from one horizontal face of the panel to the opposite face of the panel, the heat pumping means for the several panels being alternately arranged whereby opposing faces of adjacent panels are concurrently heated or cooled, means for circulating air to be conditioned through alternate ones of said passages, means for circulating outside air through the other of said passages, and drain means provided in at least one of said panels which has its cooled face disposed upwardly and its heated face disposed downwardly for conveying to the passage therebelow water condensed in the passage thereabove.

2. In an air conditioner, at least first, second, third and fourth vertically spaced horizontal panels, said panels being arranged in the order named with the first panel uppermost and providing air flow passages therebetween, a heat insulating casing having vertically disposed front and rear faces, said casing enclosing said panels and having its upper and lower walls spaced, respectively, above and below said first and fourth panels to provide inlet air passages therebetween, thermoelectric heat pumping means in each of said panels, said heat pumping means being disposed, respectively, to pump heat downwardly through said first and third panels and to pump heat upwardly through said second and fourth panels, air inlet means in the front wall of said casing communicating with said inlet air passages, air outlet means in the front wall of said casing communicating with an outlet air passage between said second and third panels, means for circulating air to be conditioned first through said inlet passages and then through said outlet passage, and means for circulating outside air through the remainder of said air passages.

References Cited in the file of this patent

UNITED STATES PATENTS

| | | |
|---|---|---|
| 2,250,978 | Weiland | July 29, 1941 |
| 2,944,404 | Fritts | July 12, 1960 |
| 2,949,014 | Belton | Aug. 16, 1960 |